United States Patent [19]
Russell

[11] Patent Number: 5,494,336
[45] Date of Patent: Feb. 27, 1996

[54] DRESS WHEEL SIMULATOR WITH TWIST LOCK MOUNTING SYSTEM

[75] Inventor: Martin E. Russell, Hendersonville, Tenn.

[73] Assignee: Del-Met Corporation, Hendersonville, Tenn.

[21] Appl. No.: 207,307

[22] Filed: Mar. 7, 1994

[51] Int. Cl.⁶ ................................................ B60B 7/14
[52] U.S. Cl. .................................... 301/37.37; 301/108.4
[58] Field of Search ............................. 301/37.1, 37.31, 301/37.32, 37.37, 108.1, 108.4

[56] References Cited

U.S. PATENT DOCUMENTS

| | | | |
|---|---|---|---|
| 2,944,853 | 7/1960 | Lyon | 301/37.37 |
| 4,606,582 | 8/1986 | Warren | 301/108.4 |
| 4,787,681 | 11/1988 | Wang et al. | 301/37.37 |
| 4,842,339 | 6/1989 | Roulinson . | |
| 4,932,724 | 6/1990 | Wright . | |
| 4,946,228 | 8/1990 | Hsu et al. . | |
| 4,950,036 | 8/1990 | Patti . | |
| 4,971,396 | 11/1990 | Morris . | |
| 5,031,965 | 7/1991 | Buerger . | |
| 5,096,263 | 3/1992 | Wright . | |

Primary Examiner—Russell D. Stormer
Attorney, Agent, or Firm—Natter & Natter

[57] ABSTRACT

A dress wheel simulator for a utility vehicle wheel includes a shell having a central hub ring with a plurality of keyhole openings formed in the hub ring. The keyhole openings are registered with wheel lug nuts and are dimensioned so as to permit the shell to pass axially over the wheel lug nuts and be positioned against either the wheel or a wheel mounting compression plate. Each keyhole opening includes a reduced dimension throat and when the shell is rotated relative to the wheel, a tapered neck portion of each wheel lug nut is engaged by the throat. A hub cover having a corresponding number of registered lug nut openings is then positioned over the hub ring with the lug nuts projecting through the hub cover lug nut openings. The clearance between the hub cover lug nut openings and the lug nuts is such that rotation of the hub cover relative to the wheel is precluded. Thereafter, the hub cover is fastened to the shell by a plurality of screws.

17 Claims, 3 Drawing Sheets

DRESS WHEEL SIMULATOR WITH TWIST LOCK MOUNTING SYSTEM

BACKGROUND OF THE INVENTION

1. Field of the Invention

This invention relates generally to dress wheel simulators which present the appearance of chromed dress wheels for truck, utility or recreational vehicles and more particularly to a dress wheel simulator having a wheel lug nut engaging mounting system.

2. Related History

With the continued upsurge in recreational/utility vehicle sales, there has been increased demand for both OEM and aftermarket decorative wheel simulators configured for such vehicle applications. The implementation of conventional automobile wheel cover wheel rim engaging fastening systems proved impractical for truck or utility vehicle large wheel applications, especially with the axial and torsional stresses generated in conjunction with deeply dished contoured rear wheels of such vehicles.

Utilization of existing wheel lug nuts to secure wheel simulators has been the generally accepted approach as illustrated in U.S. Pat. No. 5,031,965 issued to the assignee of the present invention. The fastening system disclosed therein employed a simulator shell having a plurality of openings large enough to permit the shell to be passed axially over selected wheel lug nuts. Reduced diameter openings in the shell were registered with selected wheel lugs but necessitated the removal of the lug nuts associated with such lugs in order to place the simulator shell against the wheel. After the simulator shell was fitted to the wheel, a hub cover having corresponding large and small openings was also fitted to the wheel and thereafter the removed lug nuts were employed to secure the shell and hub cover to the wheel.

While such system constituted a major improvement over prior simulator mounting systems which required the removal of all wheel lug nuts, there was concern because wheel simulator components were positioned between the compressive surfaces of the lug nuts and the associated surfaces of a wheel or a factory supplied wheel compression plate.

SUMMARY OF THE INVENTION

A dress wheel simulator is configured to cover the exterior surfaces of a truck, utility or recreational vehicle wheel. The simulator includes a shell which closely follows the contour of the utility vehicle wheel and extends, from a central hub ring, axially and radially outwardly to a wheel rim lip. The radial hub ring includes keyhole openings registered with each wheel lug nut and having a major portion dimensioned to permit the shell to be positioned axially over each of the lug nuts and against either the wheel or a factory supplied wheel mounting compression plate.

Extending in an arcuate direction from the major portion of each opening is an elongate throat having a radial span less than the maximum width of the lug nuts but greater than the width of a tapered neck at the base of each lug nut. After the shell has been positioned against the wheel or wheel mounting compression plate, it is rotated so that the throat of each opening engages the neck of each lug nut to prevent axial movement of the shell relative to the wheel.

Covers are then be applied over each of the lug nuts. Thereafter, a cylindrical hub cover having a radial flange at its open end with corresponding lug nut openings positioned in the flange is placed against the shell with the lug nut covers projecting through the openings in the hub cover flange.

Screws are then utilized to join the cover to the shell to prevent removal of the hub cover in an axial direction. The clearance between the lug nut covers and the openings in the hub cover flange is such that the hub cover cannot be rotated.

From the foregoing compendium, it will be appreciated that it is an aspect of the present invention to provide a dress wheel simulator with a twist lock mounting system of the general character described which is not subject to the disadvantages of the related history aforementioned.

It is a consideration of the present invention to provide a dress wheel simulator with a twist lock mounting system of the general character described which facilitates rapid mounting and dismounting of a simulator to and from a utility vehicle wheel.

A feature of the present invention is to provide a dress wheel simulator with a twist lock mounting system of the general character described which utilizes wheel lug nuts for securement of the simulator, without interfering with factory specified lug nut-wheel engagement.

Another aspect of the present invention is to provide a dress wheel simulator with a twist lock mounting system of the general character described which is simple to use and which employs but a modicum of components.

Another feature of the present invention is to provide a dress wheel simulator with a twist lock mounting system of the general character described which is relatively light in weight.

Yet a further aspect of the present invention is to provide a dress wheel simulator with a twist lock mounting system of the general character described which is well suited for economical low cost mass production fabrication.

To provide a dress wheel simulator having a twist lock mounting system of the general character described which does not require removal of wheel lug nuts for mounting or dismounting the simulator is a further consideration of the present invention.

Other aspects, features and considerations of the present invention in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
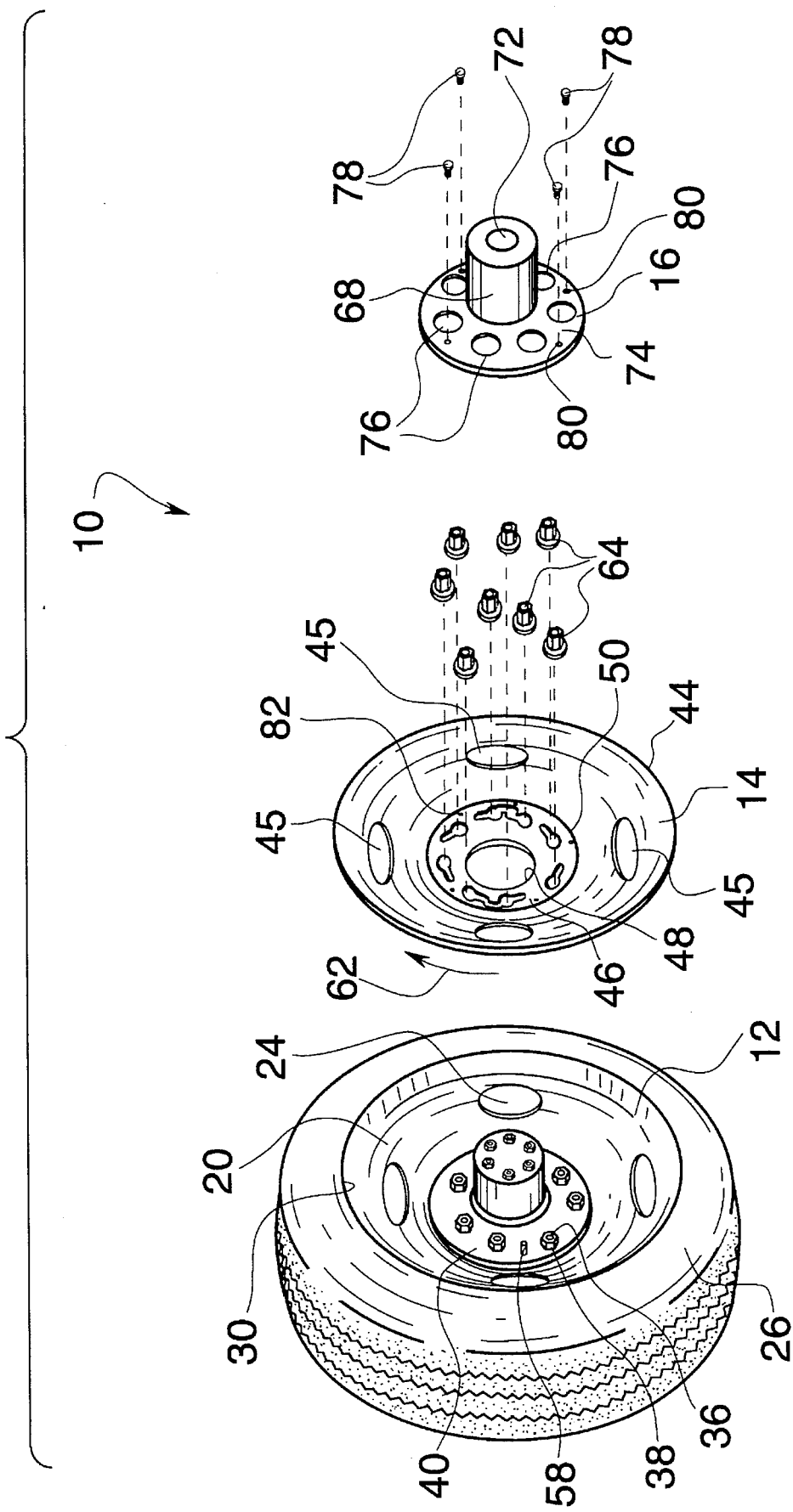
FIG. 1 is an exploded perspective view of a deep dished utility vehicle wheel with a tire mounted thereto, and illustrating the manner in which a wheel simulator with a twist lock mounting system constructed in accordance with and embodying the invention is mounted to the wheel.

Referring now in detail to the drawings, the reference numeral 10 denotes generally a dress wheel simulator with a twist lock mounting system constructed in accordance with and embodying the invention. The simulator 10 is configured to be mounted to a wheel 12 of a utility vehicle such as a truck, van, bus, camper or recreational vehicle (hereinafter collectively referred to as a "utility vehicle"). In accordance with the invention, the simulator 10 is configured to be mounted to and cover the axially exterior surfaces, i.e. the outer face, of the utility vehicle wheel 12 and includes a simulator shell 14 and a hub cover 16.

The utility vehicle wheel 12 is of conventional construction and includes a wheel rim 18 and an annular web 20 which extends from the rim to a planar annular hub 22. In order to dissipate brake drum or rotor generated heat, a plurality of spaced air vent openings 24 are provided in the wheel web 20.

The wheel 12 carries a tire 26 which is secured to the wheel rim 18 against a pair of axial wheel bead flanges 28 and the wheel rim terminates with a pair of concave annular wheel weight channels 30. As will be noted from an examination of FIG. 2, the wheel 12 is conventionally mounted to a vehicle axle having an axle flange 32 and a projecting axle hub 34. Although a rear wheel application has been depicted in the drawings, the simulator 10 may be configured for front wheel applications wherein there is no projecting axle hub. In such instances the shell is contoured to conform to the shape of the front wheel and a shallow hub cover is employed.

Carried in the flange 32 are a plurality of lugs 36, equidistantly spaced around a bolt circle, with each of the lugs 36 being engaged by a conventional lug nut 38.

In accordance with vehicle manufacturer specifications for the wheel application depicted in FIG. 1, an annular compression plate 40 is positioned between the lug nuts 38 and the wheel hub 22 for evenly distributing the wheel mounting forces generated by the lug nuts 36 and for reducing the possibility of the lug nuts working loose. The compression plate 40 includes a plurality of openings with each opening registered with an associated wheel lug 36. Each of the compression plate wheel lug openings includes, on an axially outer face, a conical counter-sunk outward flare which is engaged by a corresponding frusto-conical tapered surface or neck 42 at the base of each lug nut 38. Of significance is the fact that the lug nut necks 42 extend axially beyond the flares of the compression plate lug openings when the lug nuts are fully seated.

In accordance with the invention, the simulator shell 14 is formed of a single piece of stainless steel or like material and is configured in conformity with the shape of the wheel 12. Hence, if the wheel 12 comprises a deeply dished rear wheel of a utility vehicle, the shell 14 is similarly deeply dished. The shell extends from an outer wheel weight channel covering peripheral lip 44, radially and axially inwardly, closely following the contour of the wheel rim 18 and the wheel web 20. A plurality of openings 45 are provided through the shell 14 in registration with the wheel web air vents 24.

Figure 2:
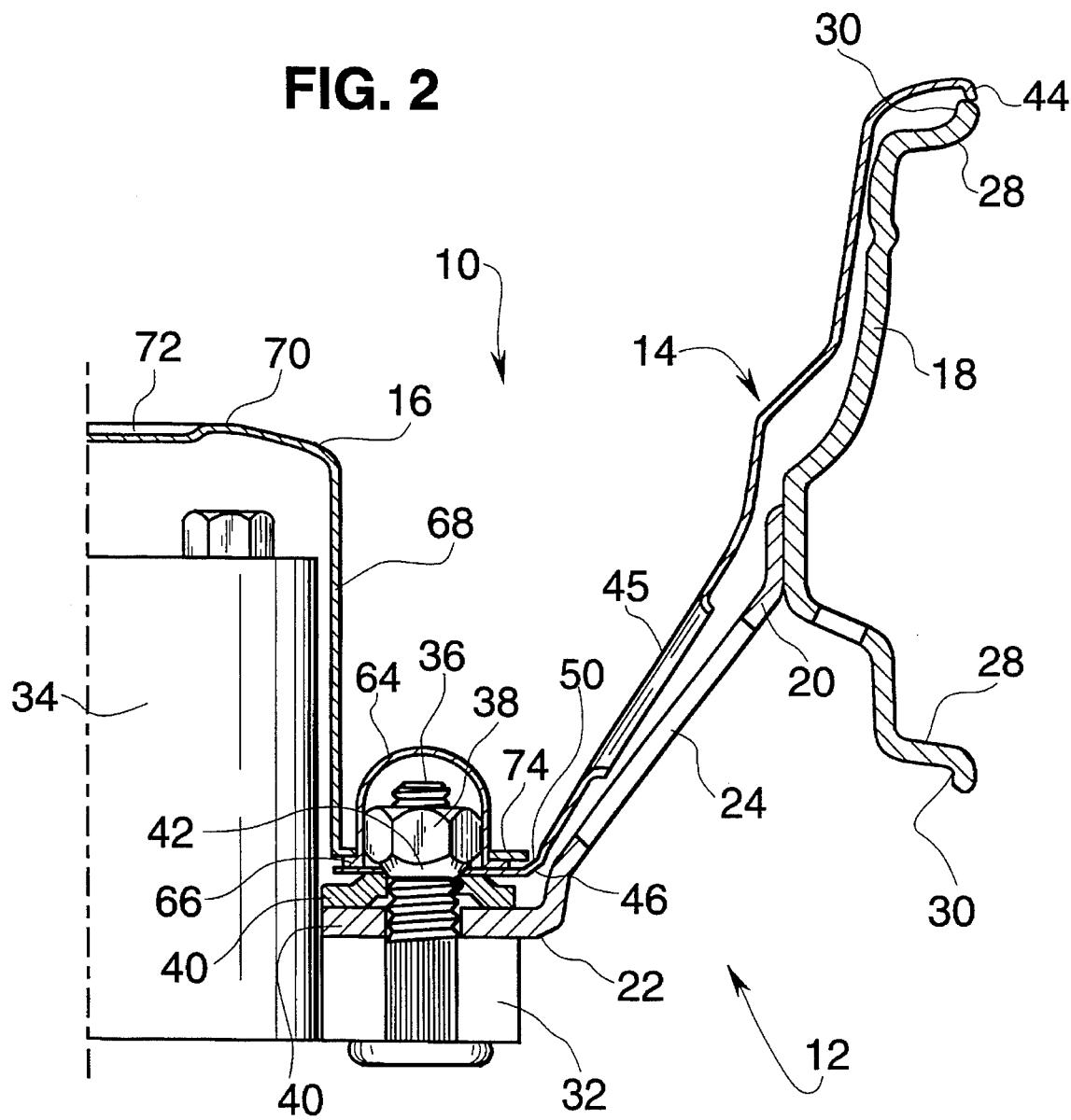
FIG. 2 is an enlarged scale fragmentary axial sectional view through the wheel with the wheel simulator mounted to the wheel.

As illustrated in FIG. 2, the profile of the shell 14 substantially traces that of the wheel 12 but is preferably spaced from the wheel rim 18 and the web 20. Preferably, physical contact between the simulator shell 14 and the wheel is made only at the peripheral lip 44 and at an inner annular hub ring 46 which contacts and bears against either the factory supplied compression plate 40 or the hub 22 of the wheel, depending upon whether or not a factory compression plate has been specified for the application.

The hub ring 46 is generally planar and extends in a radial, plane transverse to the wheel axis. The hub ring 46 is defined by a circular interior opening 48, the diameter of which is greater than the diameter of the axle hub 34, and a concentric annular bend or crease 50, formed in the shell 14.

Figure 3:
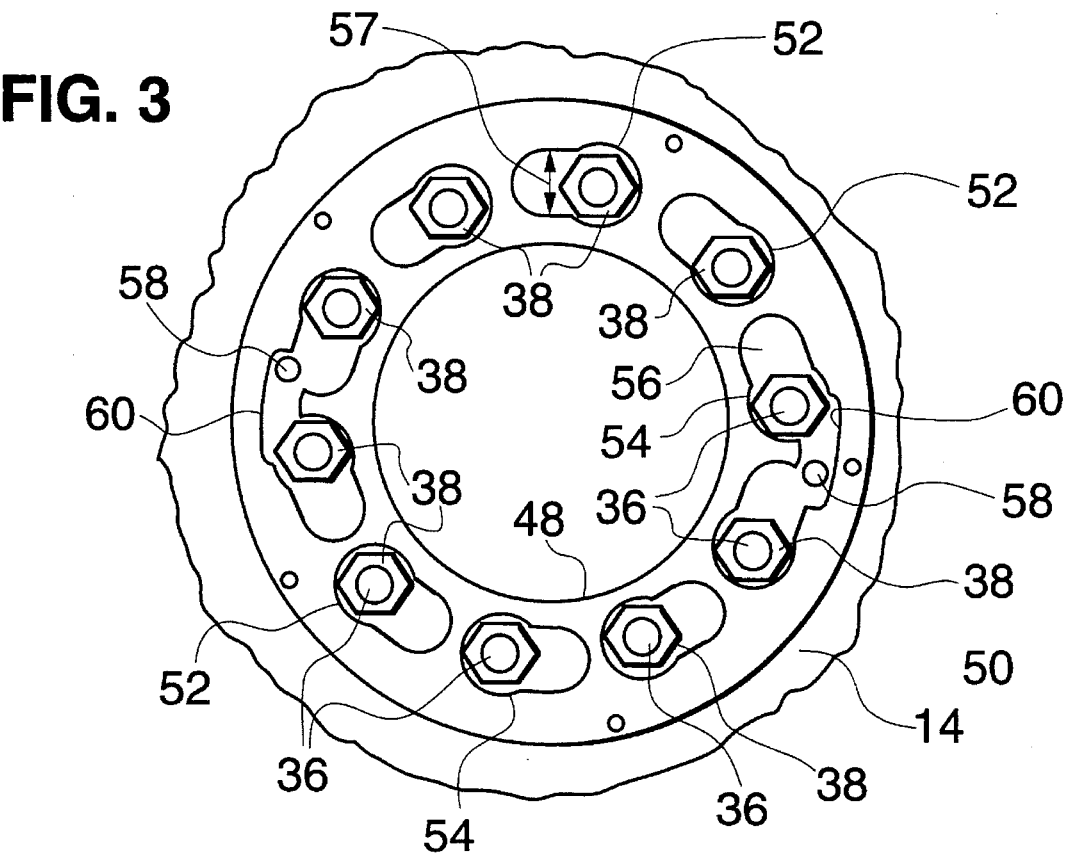
FIG. 3 is an enlarged scale fragmentary elevational view of a portion of a wheel simulator shell in an initial step of a mounting procedure and showing a plurality of lug nut openings with corresponding lugs and lug nuts and with a vehicle axle hub being deleted for the purpose of illustration only.
Figure 4:
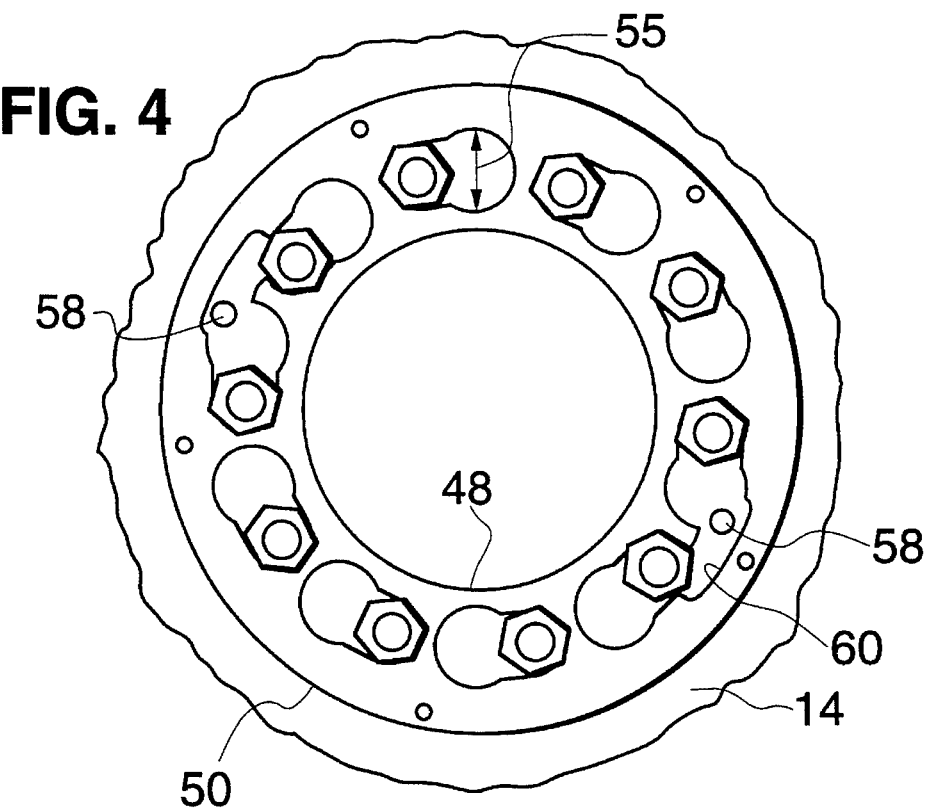
FIG. 4 is a fragmentary elevational view, similar to that of FIG. 3, but showing the simulator shell in a further step of the mounting procedure, having been rotated clockwise relative to the wheel with each of the wheel lug nuts engaged in a throat portion of each lug nut opening.

With reference now to FIGS. 3 and 4, it should be noted that the hub ring 46 includes a plurality of keyhole shaped lug nut openings 52 formed of a substantially circular major portion 54, having a radial span from the center of the wheel, denoted by the double headed arrow 55 (FIG. 4), greater than the maximum width of a lug nut, and a reduced dimension throat portion 56, having a radial span, denoted by the double headed arrow 57 (FIG. 3), less than the maximum width of the lug nut 38 but greater than the minimum diameter of the tapered lug nut neck 42. As will be noted from an examination of FIG. 3, the lug nut openings 52 assume a keyhole shape with the throat portions 56 extending arcuately, in a counterclockwise direction, from the major portion 54.

With the major portions 54 of the lug nut openings 52 registered with the lug nuts 38, as illustrated in FIGS. 1 and 3, the simulator shell 14 may be moved axially toward the wheel. Initially, the hub ring opening 48 passes over the axle hub 34. As the hub ring 46 is moved closer toward the wheel hub 22, each of the lug nuts 38 begins to project through the major portions 54 of each opening 52 until the hub ring 46 contacts the compression plate 40.

It should be noted that the wheel 12 may include, in addition to the lugs 36, a pair of diametrically opposed locating pins 58 which project from and are fixed to the axle flange 32. In order to accommodate the locating pins 58, a pair of adjacent lug nut openings 52 on diametrically opposed sides of the hub ring are joined by an arcuate channel 60.

Once the hub ring 46 has been placed against the compression plate 40, the simulator 14 is rotated in a counterclockwise direction, as depicted by the arrow 62 (FIG. 1), to a position shown in the elevational view of FIG. 4 of the drawings and in the sectional view of FIG. 2. In such position, the throat portions 56 of the openings 52 are in engagement with the portion of the necks 42 of the lug nuts 38 which extend axially beyond the compression plate. As such, the shell 14 cannot be axially removed from the wheel without first disengaging the throat portions from the lug nut necks by rotating the shell in a clockwise direction. It should also be noted that the locating pins 58 do not interfere with the mounting procedure since the channels 60 permit relative rotational movement between the wheel axle flange 32 and the simulator shell 14.

A plurality of decorative lug nut covers 64 having radial flanges 66 at their open ends are then inserted over the lug nuts 38. Thereafter, the hub cover 16 is mounted. As will be noted from FIGS. 1 and 2, the hub cover 16 includes a generally cylindrical body 68 and a capped end 70 which may include a suitable central indentation 72 for accommodating an ornament. Adjacent its open end, the hub cover 16 includes a planar radial flange 74.

Equidistantly positioned about the flange 74 along the bolt circle are a plurality of lug nut openings 76 having a diameter suitable to accommodate the lug nut covers 64 but less than the span of the lug nut cover flanges 66.

The lug nut openings 76 are registered with the lug nut covers 64 and the hub cover 16 is moved axially towards the wheel; the lug nuts and lug nut covers progressively project through the openings 76 until such time as the hub cover flange 74 contacts the lug nut cover flanges 66.

Thereafter, a plurality of screw type fasteners 78 are inserted through openings 80 in the flange 74 and engage reduced diameter registered openings 82 in the shell hub ring 46 to fix the hub cover relative to the shell.

It should be appreciated that because the screw fasteners 78 fix the hub cover to the shell, engagement between the lug nuts and the lug nut openings 76 of the flange 74 prevent the shell 14 from being rotated in a counterclockwise direction to disengage the throat portions 56 of the lug nut openings 52 from the necks of lug nuts, while the axial removal of the hub cover 16 is prevented since the shell is axially retained by the lug nuts. Thus, the simulator, comprising the shell 14 and hub cover 16 are securely mounted to the wheel 12.

It should be appreciated that although the throat portions 56 are defined by arcuate cutouts of uniform radial width, it is also possible to employ a taper or gradually reduced width in the throat portions 56 for gradual engagement with the lug nut necks 42.

Additionally, while the drawings illustrate throat portions extending in a direction for clockwise locking rotation of the shell, it may be desired to employ throat portions extending in the opposite direction for counterclockwise locking rotation, e.g. for wheels in the left side of a utility vehicle or for all vehicle wheels.

Further it is also within the ambit of the invention to configure the hub ring 46 with the keyhole openings as a separate component and have the shell and hub cover secured to the hub ring by suitable fasteners, such as screws.

Thus it will be seen that there is provided a dress wheel simulator with a twist lock mounting system which achieves the various aspects, features and considerations of the present invention and which is well suited to meet the conditions of practical usage.

Having thus described the invention there is claimed as new and desired to be secured by Letters Patent:

1. A wheel cover for a vehicle wheel, the wheel being mounted to a vehicle with a plurality of lug nuts, the wheel cover comprising decorative means for covering at least a portion of the vehicle wheel, mounting means for securing the decorative means to the wheel and means for joining the decorative means to the mounting means, means forming a keyhole shaped opening in the mounting means, the keyhole shaped opening including a major portion dimensioned greater than the maximum transverse dimension of at least one of the lug nuts and a throat portion of reduced dimension less than the maximum transverse dimension of the one lug nut, the mounting means being movable axially toward the wheel from a first position, wherein the one lug nut is axially registered with the major portion of the opening toward the wheel and over the one lug nut to a second position, wherein the one lug nut projects through the opening, the one lug nut having an axially inner base facing the wheel, the one lug nut being configured with a reduced transverse dimension adjacent the base, the mounting means being movable in a transverse radial plane from the second position to a third position wherein the throat engages the reduced transverse dimension of the one lug nut whereby the mounting means and the decorative means are prevented from being moved axially from the wheel without first disengaging the throat from the lug nut by returning the mounting means to the second position.

2. A vehicle wheel cover as constructed in accordance with claim 1 further including means for preventing movement of the mounting means in a transverse radial plane when the mounting means is in the third position, whereby the wheel cover can not be removed from the wheel.

3. A vehicle wheel cover as constructed in accordance with claim 1 wherein the mounting means is integral with the decorative means.

4. A vehicle wheel cover as constructed in accordance with claim 3 wherein the mounting means is formed of one piece construction with the decorative means.

5. A vehicle wheel cover as constructed in accordance with claim 1 wherein the wheel cover comprises a dress wheel simulator for a utility vehicle wheel, the decorative means comprising a hub cover, the means for joining the decorative means to the mounting means comprising threaded means for attaching the hub cover to the mounting means.

6. A vehicle wheel cover as constructed in accordance with claim 1 wherein the mounting means includes a like plurality of keyhole openings, the plurality of lug nuts being evenly spaced about a bolt circle concentric with the wheel axis, the throat portion of each keyhole opening lying within the bolt circle and extending from the major portion of each keyhole opening in the same rotative direction as the throat portions of all other keyhole openings, whereby the mounting means is rotatable in the transverse radial plane from the second position to the third position.

7. A vehicle wheel cover as constructed in accordance with claim 6 wherein the mounting means is annular.

8. A wheel cover for a vehicle wheel as constructed in accordance with claim 1 wherein at least one locating pin projects through the vehicle wheel, the mounting means including means forming a slot therethrough for accommodating the locating pin, the slot being so dimensioned as to permit movement of the mounting means from the second position to the third position.

9. A dress wheel simulator for a utility vehicle wheel, the wheel being mounted to a vehicle with a plurality of lug nuts, the simulator comprising a shell for covering at least a portion of the wheel, mounting means for securing the shell to the wheel and means for joining the shell to the mounting means, means forming a keyhole shaped opening in the mounting means, the keyhole shaped opening including a major portion dimensioned greater than the maximum transverse dimension of at least one of the lug nuts and a throat portion of reduced width dimension less than the maximum transverse dimension of the one lug nut, the mounting means being movable axially toward the wheel from a first position, wherein the one lug nut is axially registered with the major portion of the opening toward the wheel and over the one lug nut to a second position, wherein the one lug nut projects through the opening, the one lug nut having an axially inner base facing the wheel, the one lug nut being configured with a reduced transverse dimension adjacent the base, the mounting means being movable in a transverse radial plane from the second position to a third position wherein the throat engages the reduced transverse dimension of the one lug nut whereby the mounting means and the shell are prevented from being moved axially from the wheel without first disengaging the throat from the lug nut by returning the mounting means to the second position.

10. A dress wheel simulator for a utility vehicle wheel as constructed in accordance with claim 9 further including means for preventing movement of the mounting means in the transverse radial plane when the mounting means is in the third position, the means for preventing movement of the mounting means including a decorative hub cover, the hub cover including a planar portion, means forming at least one opening in the hub cover planar portion, the opening being dimensioned greater than the maximum transverse dimension of the one lug nut to permit the hub cover planar portion to be positioned over the lug nut and adjacent the mounting means, the opening in the hub cover being dimensioned such that engagement between the lug nut and the opening in the hub cover will substantially prevent movement of the hub cover in the transverse radial plane, the means for preventing movement of the mounting means further including means for fixing the hub cover to the mounting means, whereby engagement between the hub cover and the lug nut prevents movement of the mounting means in the transverse radial plane and engagement between the throat portion of the keyhole opening and the reduced transverse dimension of the lug nut prevents axial movement of the dress wheel simulator.

11. A dress wheel simulator for a utility vehicle wheel as constructed in accordance with claim 10 wherein the mounting means includes a like plurality of keyhole openings, the plurality of lug nuts being evenly spaced about a bolt circle concentric with the wheel axis, the throat portion of each keyhole opening lying within the bolt circle and extending from the major portion of each keyhole opening in the same rotative direction as the throat portions of all other keyhole openings, the hub cover planar portion including a like plurality of openings.

12. A dress wheel simulator for a utility vehicle wheel as constructed in accordance with claim 11 further including a lug nut cover positioned over each lug nut.

13. A dress wheel simulator for a utility vehicle wheel as constructed in accordance with claim 12 wherein the lug nut covers are positioned between each lug nut and each corresponding opening in the hub cover planar portion.

14. A dress wheel simulator for a wheel mounted to a utility vehicle by a plurality of lug nuts evenly spaced about a bolt circle, the simulator comprising a annular metal shell, the shell being configured to overlie and cover a major portion of the vehicle wheel, the shell including an annular hub ring extending in a plane perpendicular to the axis of the shell, means forming a like plurality of keyhole openings in the hub ring, the keyhole openings being of a size sufficient to permit the shell to be axially positioned adjacent the wheel such that lug nuts employed to mount the wheel to the vehicle project through the keyhole openings, each lug nut having a tapered neck portion facing the wheel, each keyhole opening including a reduced dimension throat portion suitable for engagement against the tapered neck portion of each lug nut when the shell is positioned adjacent the wheel and rotated about the axis of the wheel, whereby axial movement of the shell relative to the wheel will be prevented, the simulator further including a hub cover, the hub cover having a like plurality of openings, each opening being dimensioned to accommodate a wheel lug nut whereby the hub cover may be placed against the hub ring with a lug nut projecting through each of the hub cover openings, the hub cover openings being dimensioned such that engagement with the lug nuts will prevent rotation of the hub cover relative to the wheel, and means for securing the hub cover to the shell, whereby the simulator is securely retained to the wheel.

15. A dress wheel simulator as constructed in accordance with claim 14 further including a plurality of lug nut covers, each lug nut cover projecting through an opening in the hub cover.

16. A method of mounting a dress wheel simulator constructed in accordance with claim 14, the method comprising the steps of:

(a) registering the simulator shell and the wheel with the keyhole openings registered with corresponding lug nuts, (b) axially moving the shell toward the wheel to a position such that the lug nuts project through the keyhole openings, (c) engaging the tapered neck portions of the lug nuts with the throat portions of the keyhole openings by rotating the shell relative to the wheel, (d) axially registering the hub cover with the wheel, (e) placing the hub cover against the shell with the lug nuts projecting through the openings in the hub cover, and (f) non-rotatably securing the hub cover to the shell.

17. A method of mounting a dress wheel simulator constructed in accordance with claim 16, wherein the step of non-rotatably securing the hub cover to the shell includes the step of driving screws in corresponding registered openings of the hub cover and the shell.

\* \* \* \* \*